March 20, 1928.
J. T. COMPTON
1,663,192
BALL TURNING ATTACHMENT FOR LATHES
Filed May 26, 1927    3 Sheets-Sheet 1
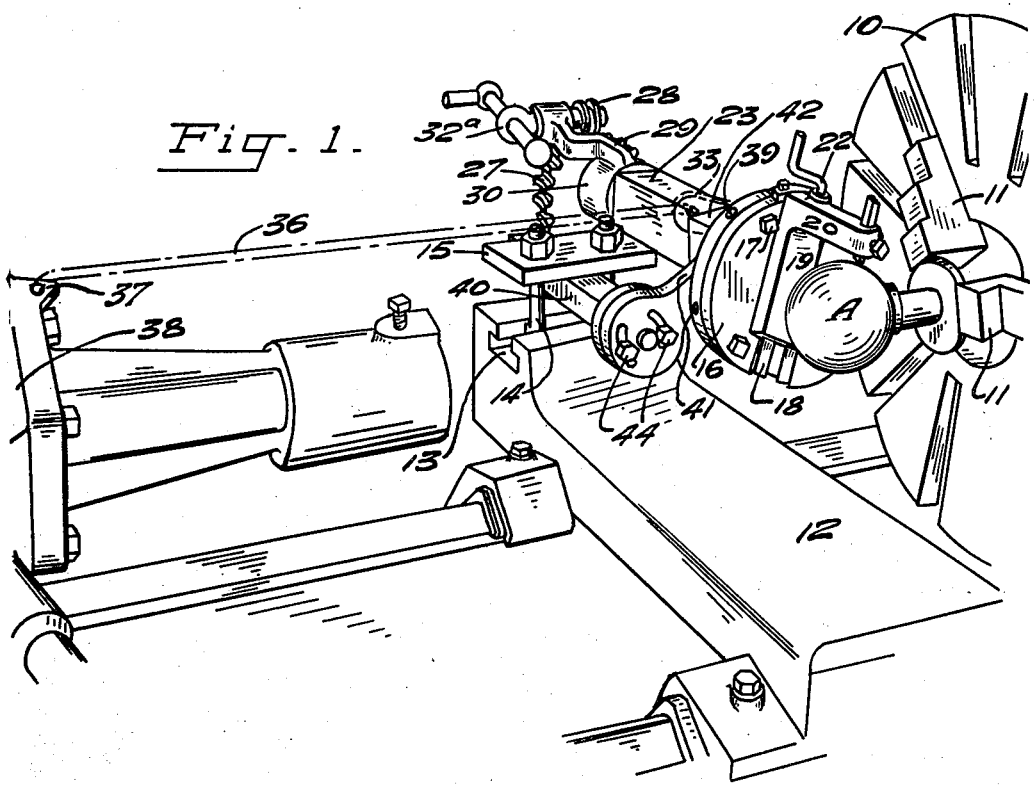
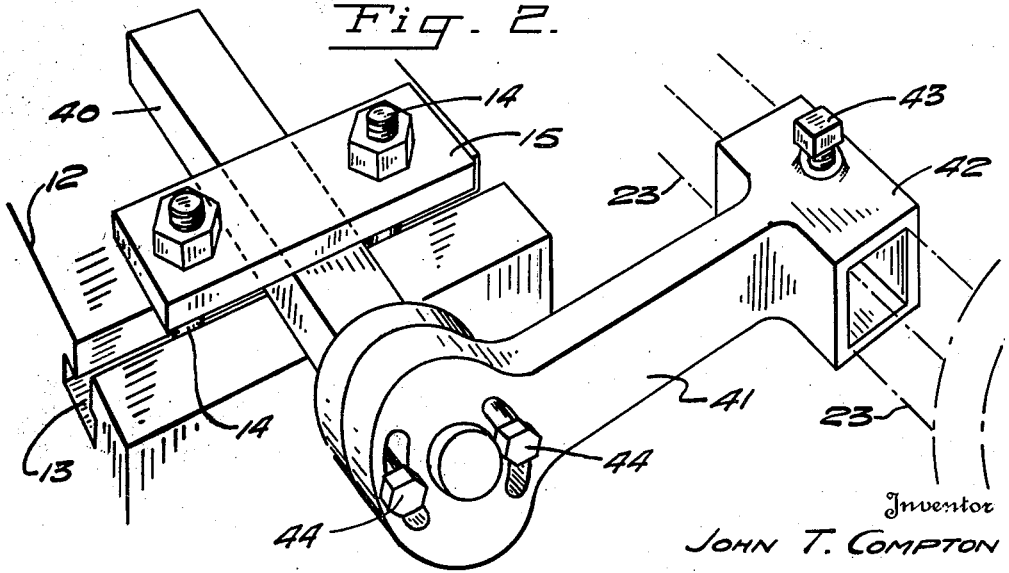
Inventor
JOHN T. COMPTON
By Watson E. Coleman
Attorney March 20, 1928.  
J. T. COMPTON  
1,663,192  
BALL TURNING ATTACHMENT FOR LATHES  
Filed May 26, 1927   3 Sheets-Sheet 2
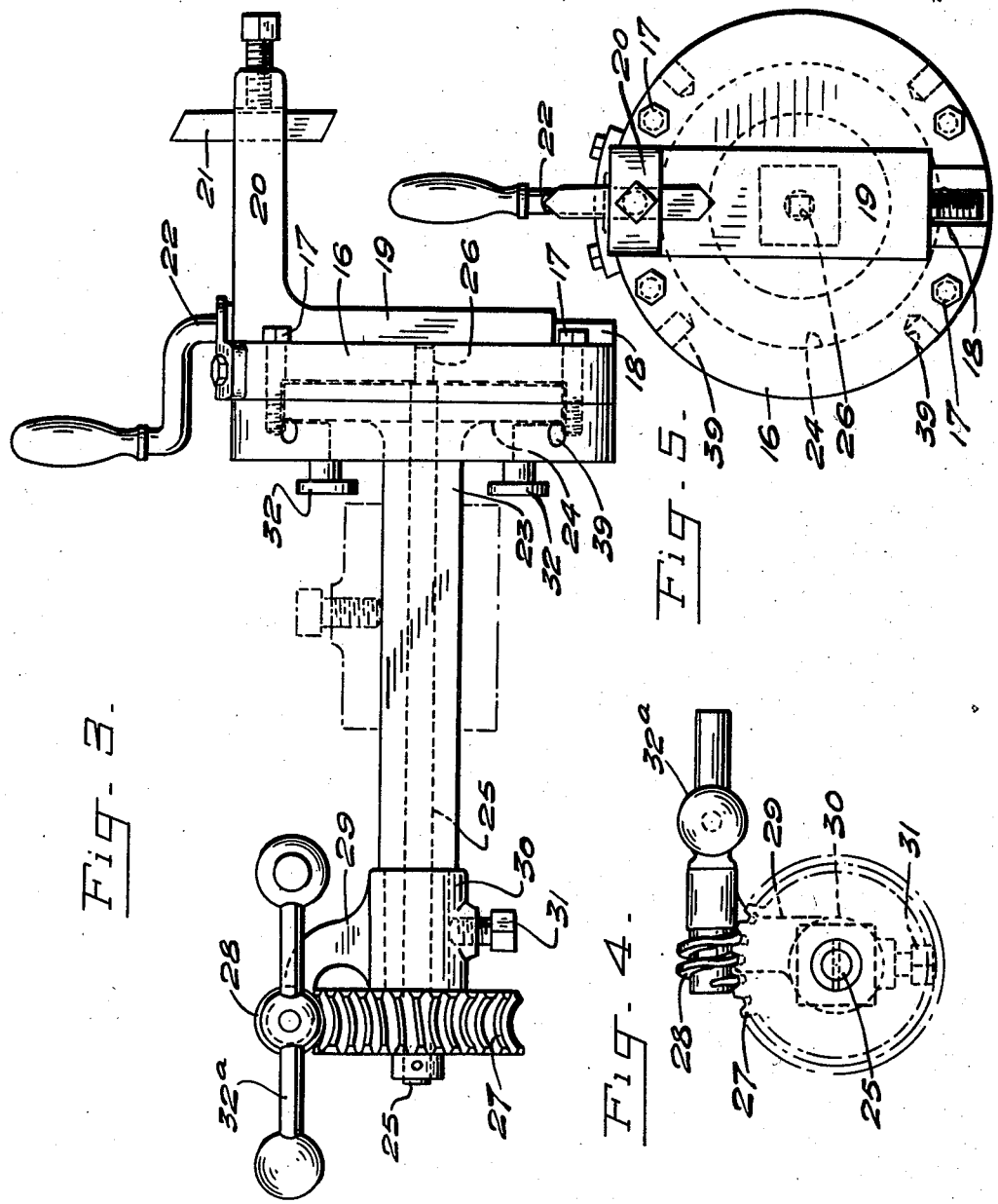
Inventor  
JOHN T. COMPTON  
By Watson E. Coleman  
Attorney March 20, 1928.                                               1,663,192
J. T. COMPTON
BALL TURNING ATTACHMENT FOR LATHES
Filed May 26, 1927          3 Sheets-Sheet 3

Inventor
JOHN T. COMPTON
By Watson E. Coleman
Attorney

Patented Mar. 20, 1928.

1,663,192

UNITED STATES PATENT OFFICE.

JOHN T. COMPTON, OF MONTGOMERY, ALABAMA.

BALL-TURNING ATTACHMENT FOR LATHES.

Application filed May 26, 1927. Serial No. 194,433.

This invention relates to mechanism for turning spherical objects, and particularly to devices of this nature adapted to be used on lathes wherein the work is mounted in the usual rotatable chuck and the tool carrier is of such construction and is so supported as to cause the tool to oscillate through an arc at right angles to the plane of rotation of the work.

One of the objects of the present invention is to provide a tool carrier for this purpose which may be readily mounted in connection with an ordinary lathe and mounted upon the carriage of the lathe and in which the tool may be oscillated by a connection to the turret of the lathe by a worm and worm wheel or directly by a manual application to the tool carrying head.

A further object is to provide a construction of this character which will permit the mechanism to be mounted in any lathe without detaching anything from or adding anything to the lathe.

A still further object is to provide mechanism of this character which may be readily attached to or detached from the lathe.

My invention is illustrated in the accompanying drawings, wherein:—

Figure 1 is a perspective view of a portion of a lathe with my ball turning attachment applied thereto;

Figure 2 is a fragmentary perspective view showing the means for supporting the attachment;

Figure 3 is a side elevation of the attachment, the supporting means being shown in dotted lines;

Figure 4 is an elevation of the means for rotating the shaft of the attachment;

Figure 5 is an end elevation of the structure shown in Figure 3;

Figure 7:
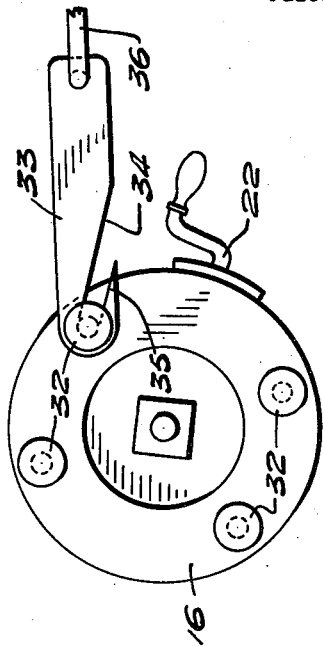
Figures 6 and 7 are rear elevations of the attachment showing the means for automatically oscillating the attachment.

Referring to these drawings, 10 designates the work-holding chuck of the lathe which has the usual chuck jaws 11 supporting the work A which is to be turned in the form of a sphere. The carriage 12 has a transversely extending slot 13 as usual, and headed bolts 14 operate in this slot and engage with the clamping bar 15. Clamped upon the carriage by means of this clamping bar 15 is a support for an oscillatable head 16, this supporting means being in detail as will be hereinafter described. This head 16 is preferably formed in two sections, as illustrated in Figure 3, held together by the screws 17. The head is formed with a diametrically extending slot 18, and operating in this slot is the angular tool holder 19 having an outwardly extending portion 20 supporting the tool 21. This tool 21 acts upon the work A, as will be obvious from Figure 1. The slide 19 is shifted along the slot 18 and held in any shifted position by means of the adjusting screw 22 of obvious character. The head 16 is mounted for oscillation in a plane at right angles to the plane of rotation of the work A.

As illustrated in Figure 2, the head 16 is hollow and extending into this hollow head is a shank 23 which may be clamped upon the carriage in any suitable manner. This shank 23 is provided with a head 24 upon which the hollow head 16 is oscillatably mounted. As illustrated in Figure 2, this shank 23 is clamped indirectly by the clamping bars 15 and bolts 14.

Extending longitudinally through this shank 23 is the shaft 25 whose inner end is squared or otherwise formed to fit a correspondingly formed, many-sided aperture 26 in the head 16 so that as the shaft rotates, the head will rotate. This shaft 25 extends beyond the shank 23 and carries upon it the worm wheel 27 operated by means of a worm 28 supported in a suitable bearing carried by a bearing bracket 29 which is mounted upon a bearing sleeve 30. This sleeve is held upon the shank by means of a set screw 31. The worm 28 is provided with a handle 32ª whereby the worm may be turned.

With this construction, it is obvious that as the worm 28 is turned, the shaft 25 will be turned, which will rotate the head 16 and cause the tool 21 to move in a plane at right angles to the plane of rotation of the chuck and of the work, and that the adjusting screw 22 may be turned to shift the tool nearer to or further from the axial center of the work so as to provide for turning balls of greater or less diameter.

Figure 6:
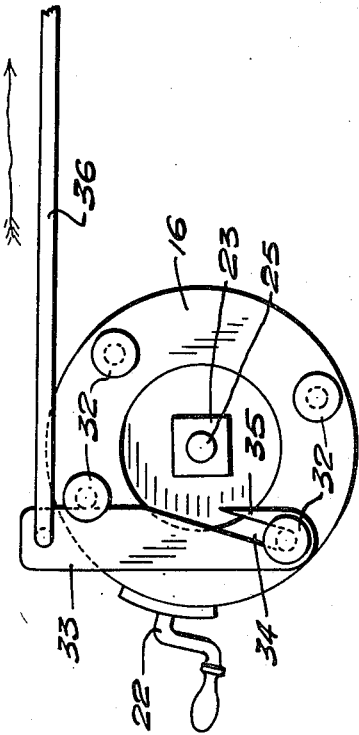

The construction which I have described provides a finely adjustable means for turning the ball slowly and evenly, but I may provide automatic means for this purpose, and to this end the head 16 is formed upon its rear face with a plurality of outwardly projecting headed studs 32 which, as illustrated, are four in number and arranged as illustrated in Figure 6. Operating in connection with these studs is a shank 33 having a longitudinally extending, inclined slot 34 which defines the inner face of the bill of a hook, the bill being designated 35. This slot and hook are formed so as to engage with one of these studs 32, as shown in Figure 6. The metallic arm 33 or link, as it may be called, when engaged with one of the studs initially bears against another of these studs, and pivotally connected to the outer end of this arm 33 is a link 36 which extends to a lug 37 on the turret 38 of the lathe. This turret as illustrated, rotates in a horizontal direction and is of any usual or suitable form and, as usual, is used for the purpose of bringing any one of a number of different cutters or other operating devices into position in connection with the work. As this tool rotates, therefore, in one direction, it will draw upon the arm 33 through the rod 36 and this will cause a rotation of the head 16 in a direction to cause the tool to move through a half circle at right angles to the plane of rotation of the work.

Figure 9:
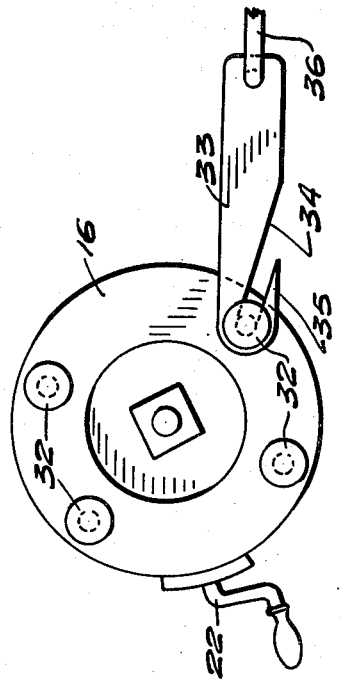
Figures 8 and 9 are like views to Figures 6 and 7 but showing the reverse connection.
Figure 8:
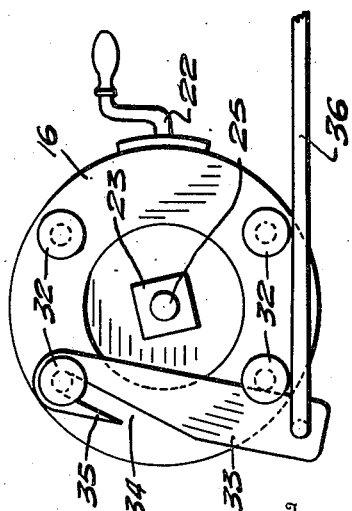

In Figures 5, 6 and 7, I show two positions taken by the arm 33 at the beginning and end of the cut, with the connecting rod 36 moving in the direction of the arrow. In Figures 8 and 9, I show reversed positions for the arm 33 when the connecting rod is moving in the same direction but it is desired to reverse the direction of rotation of the head 16. This connection to the head 16 may be quickly made and equally quickly the connection may be made to the turret of the lathe so that the tool may be caused to rotate in a clockwise direction or in a counterclockwise direction with reference to the work.

In addition to this means for rotating the tool, I provide the periphery of the head 16 with a plurality of radial openings or sockets 39 into which pins may be inserted so as to turn the head 16 by hand in one direction or the other. I have thus provided three different ways of oscillating the head 16.

In Figure 2, I show a means for supporting the head 16 and the tool feeding means shown in Figure 3 if desired, which will permit this device to be applied to any lathe. To this end, I provide a hold-down bar 40 which extends beneath the clamp 15 and rotatably mount upon the end of the hold-down bar the arm 41, which at its outer end carries the sleeve 42 rectangular in cross section and having the set screw 43. The shank 23 may be disposed within this sleeve and clamped in position therein and the shank 23, of course, may be shifted through the sleeve nearer to or further from the work, as desired. It will be obvious that exactly the same feeding means may be used with the construction illustrated as is used where the shank 23 is mounted directly on the carriage. The mounting means shown in Figure 2, however, does away with the necessity of blocking up the support for the shank 23, as the arm 41 may be adjusted vertically to any desired extent and then held by the nuts 44 or by a single nut engaging the reduced end of bar 40.

It will be seen that with this construction any spherical object may be turned in the ordinary turret lathe or in any lathe of common construction without removing any parts or in any way changing the lathe and that the tool may be shifted transversely of the plane of rotation of the work either by hand or by a movement of the tool. The tool may be adjusted inward or outward by means of the adjusting screw 22, and inasmuch as the tool is supported immediately above the longitudinal axis of the work, it follows that spheres of different sizes may be cut without any longitudinal adjustment of the shank 23. The feeding mechanism connected to the turret is very simple and has considerable advantage over the ordinary ratchet for securing an even feed and smooth cut. If the tool should be almost on center at the left next to the chuck and the feed is started, the head 16 would immediately begin to rotate by the action of rod 36, this rod being fastened to the turret as described or to the spindle which, of course, must travel backward. In most turret lathes such, for instance, as the Gisholt lathe, three tools may be used on the turret, while my mechanism is connected to the turret, and my mechanism does not in any way interfere with the use of the usual taper attachment.

It is to be understood that while I have before referred to turning spherical objects, that by shifting the slide 19 inward so as to carry the tool 21 below the axial center of the head that this tool will cut concavities. It will be understood, of course, that I have not attempted to illustrate any of the details of the lathe, as these are well known and require no illustration.

It will be understood, of course, that when power feed is applied to the shaft 25, the shaft 25 must run loosely through the worm wheel 27. To this end, the worm wheel is held in place upon the shaft preferably by a removable pin 27ª passing through the hub of the worm wheel. While I have before referred to the work as being mounted in the usual rotatable chuck, the work may be also swung between centers. It will be obvious that a tool may be mounted upon the tool carrier to turn a small stem upon the ball A or to cut off this ball.

I claim:—

1. The combination with a lathe having a rotatable work supporting chuck, of a tool support mounted upon the lathe and including an oscillatably mounted head, the head oscillating in a plane at right angles to the plane of rotation of the work, a tool holder mounted upon said head for radial movement and carrying a tool at its extremity adapted to engage the work, means for oscillating the head by hand, and means for oscillating the head by power including a plurality of headed studs projecting from the rear face of the head, a longitudinally extending rod having a hook-like member pivotally engaged therewith at one end, the hook-like member being engageable with any one of said studs and the rod being engageable with a movable part of the lathe.

2. The combination with a lathe having a rotatable work supporting chuck, of a tool support mounted upon the lathe and including an oscillatably mounted head, the head oscillating in a plane at right angles to the plane of rotation of the work, a tool holder mounted upon said head for radial movement and carrying a tool at its extremity adapted to engage the work, said head being hollow and the rear face of the head being provided with four rearwardly projecting studs arranged at spaced distances, a shank engaging in the hollow head and supporting the head for rotation, means extending through the shank whereby the head may be rotated, means for rotating the head by power consisting of a connecting rod adapted to be connected to a moving part of the lathe, and a link pivoted to the end of the connecting rod and formed with an inclined slot at one end defining a hook, the hook being engageable with any one of said studs.

3. A spherical turning attachment for lathes comprising a hold-down bar adapted to be mounted upon the lathe, an arm mounted upon the hold-down bar for adjustment therearound and having a sleeve, a shank adjustable through said sleeve, a head rotatably mounted upon the shank, the head being rotatable in a plane at right angles to the plane of rotation of the work, a tool holder mounted for movement diametrically across the face of said head and having an outwardly projecting tool-carrying arm, means for adjusting the tool holder transversely of the head, and means for oscillating the head.

In testimony whereof I hereunto affix my signature.

JOHN T. COMPTON.